United States Patent [19]
Brown

[11] Patent Number: 6,115,400
[45] Date of Patent: Sep. 5, 2000

[54] TOTAL INTERNAL REFLECTION THERMALLY COMPENSATED ROD LASER

[76] Inventor: David C. Brown, R.R. #1, Box 356J, Brackney, Pa. 18812

[21] Appl. No.: 09/138,276

[22] Filed: Aug. 20, 1998

Related U.S. Application Data

[60] Provisional application No. 60/056,620, Aug. 20, 1997.
[51] Int. Cl.[7] .............................. H01S 3/06; H01S 3/081
[52] U.S. Cl. .................................. 372/93; 372/66
[58] Field of Search ................... 372/93, 71, 66, 372/95, 108, 99, 40, 69, 84

[56] References Cited

U.S. PATENT DOCUMENTS 5,432,811   7/1995   Polushkin et al. ..................... 372/66

*Primary Examiner*—Frank G. Font
*Assistant Examiner*—Armando Rodriguez
*Attorney, Agent, or Firm*—Alix, Yale & Ristas, LLP

[57] ABSTRACT

A total-internal-reflection thermally compensated rod laser including a lasing rod composed of crystalline or glass material doped with at least one lasing ion. The rod has an optical axis, an axially extending, substantially optically flat, exterior surface, and a substantially optically flat conical surface at each end. Both conical end surfaces are coaxial with the optical axis and has a truncated tip. The first end has a convex surface and the second end has a concave surface. The rod has a geometry, including a diameter and a length, selected to provide substantially no net depolarization of an incident beam.

19 Claims, 11 Drawing Sheets

TOTAL INTERNAL REFLECTION THERMALLY COMPENSATED ROD LASER

This application claims benefit of Provisional Application Ser. No. 60/056,620 filed Aug. 20, 1997.

BACKGROUND OF THE INVENTION

This invention relates generally to solid state lasing elements. More particularly, the present invention relates to total internal reflection rod-shaped lasing elements.

Heat is generated in solid-state lasing elements as part of the optical pumping process in which a flashlamp, diode-array, or other sources excite the lasing ions doped into solid-state laser materials such as Nd:YAG, Yb:YAG, Er:YAG, and many others. See D. C. Brown, "Heat, Fluorescence, and Stimulated-Emission Power Densities and Fractions in Nd:YAG," IEEE Journal of Quantum Electronics, Volume 34, pages 560–572, 1998. For very low repetition-rate operation, ample time between pulses allows the laser material to return to thermal equilibrium and no deleterious effects on laser performance occur. When, however, the average pumping and laser output power becomes significant, thermal effects begin to play a significant role and the effect on laser efficiency and operation can be severe.

For rod geometry lasers where the lasing material is a right circular cylinder, attempts to remove the heat generated usually involve cooling the rod 10 along its barrel with water 12 as shown in FIG. 1. Under ideal circumstances in which the pumping of the rod is absolutely uniform and heat is removed in a symmetric and uniform way along the rod barrel, and rod materials parameters independent of temperature, a temperature distribution is established in the rod transverse dimension which can be calculated analytically. It has been found that the radially dependent temperature distribution varies quadratically with the radial coordinate r. See W. Koechner, "Solid-State Laser Engineering," 4th Edition, Springer-Verlag (1996). In essence the heat is distributed across the rod such the highest temperature is at the center of the rod and the lowest temperature is at the rod barrel.

In common laser materials such as Nd:YAG, the index of refraction is a function of temperature and in fact increases with temperature. Hence, there exists a radially varying index of refraction distribution in the rod that follows the temperature distribution wherein the temperature is largest in the center and lowest at the rod edge or barrel. Because of the radially varying index of refraction, light propagation through the rod is affected. Because light travels slower as the refractive index increases (at a speed v=c/n where c is the vacuum speed of light and n the index of refraction), it travels most slowly along the rod axis and fastest at the rod edge.

As shown in FIG. 1, an incident plane wave 14 with flat phase front looks curved 16 after propagating through the rod since the center phase is retarded with respect to the rod edge. It can be shown that ideally the rod functions like a thick lens and that, in the presence of strong thermal effects, the beam exiting the rod is focused. There are two such foci in a laser rod such as Nd:YAG. The tangential and radial polarizations have separate foci that do not overlap, and the focal lengths can be calculated exactly. See W. Koechner, "Solid-State Laser Engineering," 4th Edition, Springer-Verlag (1996). An associated phenomena, birefringence, accompanies strong thermal focusing. For linearly polarized input to the amplifier, a phase difference is accumulated between the radial and tangential components of the polarization. The magnitude of the phase difference depends upon the type of lasing material used, the thermal loading of the rod, and the location in the aperture. Such birefringence is detrimental in rod lasers that must use an intracavity polarizer, such as some Q-switched lasers, since the output from the rod is elliptically polarized and significant losses can result from the polarizer. See W. Koechner, "Solid-State Laser Engineering," 4th Edition, Springer-Verlag (1996).

If the rod is pumped harder and harder the thermally-induced focusing becomes stronger and stronger. Laser resonators that use rod amplifiers are then particularly susceptible to this phenomena. As pumping average power is increased, the rod focuses more strongly. This results in changes in the mode-structure or content of the output beam, a continuous change in the output beam quality, and eventually instability of the resonator thereby causing it to stop lasing. In some resonators, beam quality improves with operating average power until the best beam quality is achieved. Pumping beyond this single point then results in degradation of beam quality.

A number of attempts to reduce or eliminate the thermal focusing have been implemented. For example, a slab 18 (FIG. 2) may be used rather than a rod of laser material such as disclosed in U.S. Pat. No. 3,633,126. The beam is totally-internally-reflected back and forth between the slab faces 20 through which pumping is incident. A flow of water 12 along the slab TIR faces cools the laser crystal (see FIG. 2). The medium used to construct the slab is usually a crystalline or glass material although liquids have also been used. The slab ends 22 are usually either uncoated and cut at or near Brewster's angle so that there are no reflective losses, or anti-reflective (AR) coated for some arbitrary angle of incidence on the faces. The slab is usually thin, typically 5–7 mm, and long. It is usually designed to operate with an even number of bounces off the slab faces through which pump light is delivered to the lasing material. The slab is either transversely cooled with typically water, a water/ethylene glycol mixture, or gas either as shown in FIG. 2 or most often using longitudinal cooling along the slab faces. Conduction cooling has also been used. The pump faces and end faces must be optically flat and accurately cut and oriented; bouncing off the slab faces is via TIR so 100% reflection is obtained.

This technology is referred to in the literature as a face-pumped total-internal-reflection (TIR) laser or slab laser. Other more recent variants of that concept are the hex laser concept of U.S. Pat. No. 4,740,983, and the edge-screw laser of U.S. Pat. No. 4,912,713. Slab laser technology has been developed to the point where kilowatt levels of power can be achieved with excellent output beam-quality that remains constant in the TIR direction. The zig-zag path of the beam back and forth within the laser slab results in internal compensation for thermal effects since each ray incident upon the input aperture experiences approximately the same total thermal environment. Thus, first-order thermal focusing does not occur in a TIR slab laser.

U.S. Pat. Nos. 3,810,040 and 3,810,041 disclose liquid cooled slab lasers. U.S. Pat. No. 3,679,999 discloses a slab laser which is conduction cooled with gas. The main difficulty with the slab laser is that the beam-quality does not remain constant in the direction orthogonal to the TIR direction, or the transverse direction. Many attempts have been made to rectify this situation. However, while the thermal effects may be reduced by various techniques, the output beam-quality and mode-structure remain functions of the average power. When the beam is propagated and used for certain processes, such as percussion drilling, the spot remains constant in size in the TIR direction but varies in the transverse dimension, thereby leading to processing effects that are average power dependent. For many applications this situation is intolerable.

Polygonal rod elements which do not employ TIR to internally self-compensate thermal focusing are disclosed in U.S. Pat. No. 5,432,811. To eliminate the slab's lack of thermal compensation in the transverse direction, "hex" TIR laser elements of U.S. Pat. No. 4,740,983 and square rods of U.S. Pat. No. 4,912,713 totally internally reflect the beam simultaneously in two dimensions. The TIR rod laser element described here has the advantage that it can be used as a replacement for conventional laser rods and remains "in-line" with the resonator optical axis. Conventional laser rods are the most common lasing elements and are pumped typically as shown in FIGS. 3 and 4 where flashlamp and diode-pumping schemes are shown. The rod is in all cases surrounded by a flowtube that encloses an annulus of flowing water or other fluid used to cool the rod.

SUMMARY OF THE INVENTION

Briefly stated, the invention in a preferred form is a total-internal-reflection thermally compensated rod laser which includes a lasing rod composed of crystalline or glass material doped with at least one lasing ion. The rod has an optical axis and an axially extending, substantially optically flat, exterior surface. Each end of the rod has a substantially optically flat conical surface.

The conical end surfaces are coaxial with the optical axis. The first end has a convex surface and the second end has a concave surface. The apex or each conical end surface has a truncated tip. The conical surface of the first end may have an apex having an angle $\alpha$ which is selected to provide predictable internal lossless TIR bounces. Alternatively, $\alpha$ may have a value substantially equal to the complement of Brewster's angle. The rod has a geometry, including a diameter and a length, selected to provide substantially no thermal focusing of an incident beam.

In one embodiment the rod has an axially extending center column and an annular portion disposed around the column. The center column is doped with an active lasing ion and the annular portion is composed of a clear laser material or an amplified spontaneous emission absorbing material. In another embodiment, the rod includes a second annular portion disposed around the other annular portion and the column. In this embodiment, the center column is doped with an active lasing ion, the inner annular portion is composed of a clear laser material, and the outer annular portion is composed of an amplified spontaneous emission absorbing material.

An annulus of fluid is disposed around the rod to actively cool it. The fluid may be composed of water, water and ethylene glycol, gas, or cryogenic fluid.

It is an object of the invention to provide a new and improved total-internal-reflective lasing rod.

It is also an object of the invention to provide a new and improved lasing rod that is thermally compensated and has no net depolarization on an incident beam due to TIR reflections.

Other objects and advantages of the invention will become apparent from the drawings and specification.

BRIEF DESCRIPTION OF THE DRAWINGS

The present invention may be better understood and its numerous objects and advantages will become apparent to those skilled in the art by reference to the accompanying drawings in which.

DETAILED DESCRIPTION OF THE INVENTION

Figure 5:
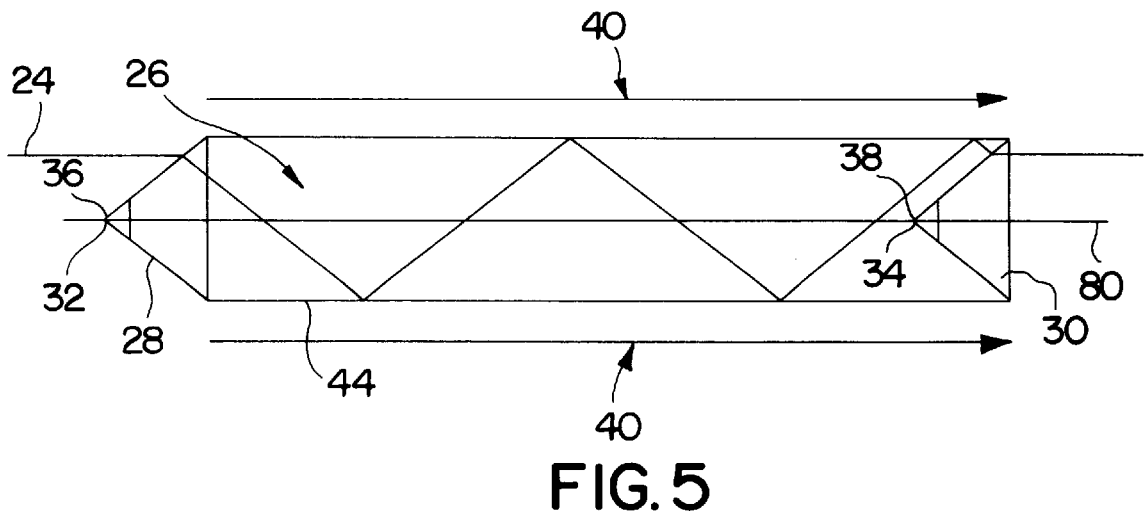
FIG. 5 is a schematic side view of a total-internal-reflection thermally compensated rod laser in accordance with the invention.

The invention described here significantly improves on the conventional laser rod geometry by total-internal-reflecting the laser beam 24 traversing through the rod 26 as shown in FIG. 5. The conical ends 28, 30, which correspond to the tilted ends 22, cooperate in a slab laser to reflect the beam back and forth in a zig-zag fashion through the thermal gradient in a controlled and precise way. The conical ends 28, 30 are preferably congruent, matched convex and concave optical structures. Other than the two conical ends 28, 30 and a prescribed rod length, the laser rod is configured similarly to a conventional laser rod. The rod is composed of crystalline or glass material doped with at least one lasing ion.

By orienting the conical surfaces 28, 30 as shown in FIG. 5, with both cone apexes 32, 34 facing in the same direction, it can be shown that each ray 24 incident on the face 32 experiences the same total thermal environment, and to first-order approximation, the wavefront traversing the zig-zag rod experiences no thermal focusing effects. The same is not true if the apexes face in opposite directions; and in addition, with that orientation, the beam is turned "inside-out". As with the slab laser, the conical surface can be oriented at Brewster's angle with no coatings applied or at some other angle with an appropriate AR coating.

In the ideal case, each conical end 28, 30 terminates in a very sharp point. In practice such a sharp point cannot be fabricated since the tip 36 will fracture. Thus, each conical end must be truncated by a small amount as shown in FIG. 5. Also, the sharp end 38 on the concave inward (right) end will also have to be flattened slightly. Where truncated, the surface must be ground or roughened, or the two truncated surfaces 36, 38 canted with respect to one another to keep laser action from building up through those faces. The rod 26 is cooled by enclosing it in an annulus and providing a flow system that provides uniform flow 40 over the entire outside surface 44, with the exception of small regions on the ends where O-ring seals 42 (FIG. 14) must be placed. The reflections on the rod barrel 44 are TIR in nature and provide 100% reflection for any polarization. The rod faces 28, 30 and barrel 44 must be accurately finished and be optically flat, preferably to one wavelength A or better. This can be achieved by using a recently perfected optical finishing technique, diamond turning.

Figure 1:
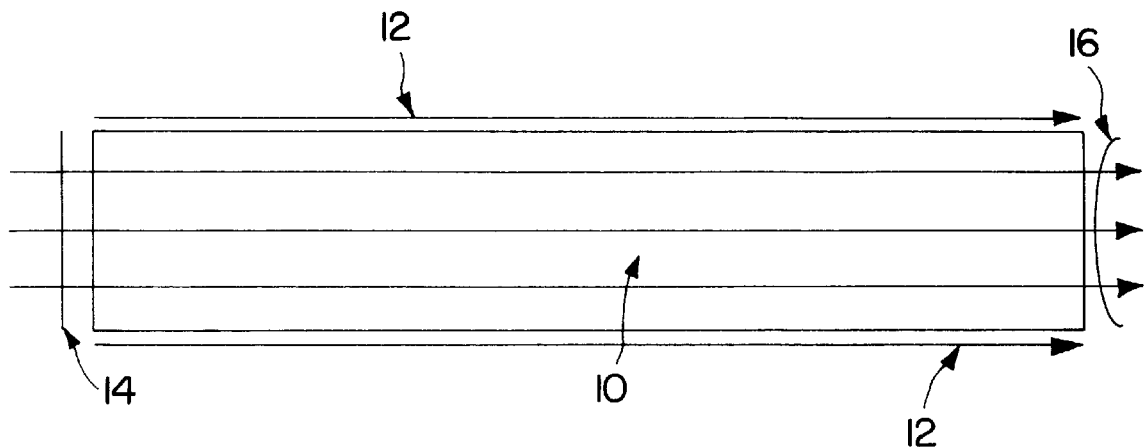
FIG. 1 is a schematic side view of a conventional straight-through rod amplifier.
Figure 2:
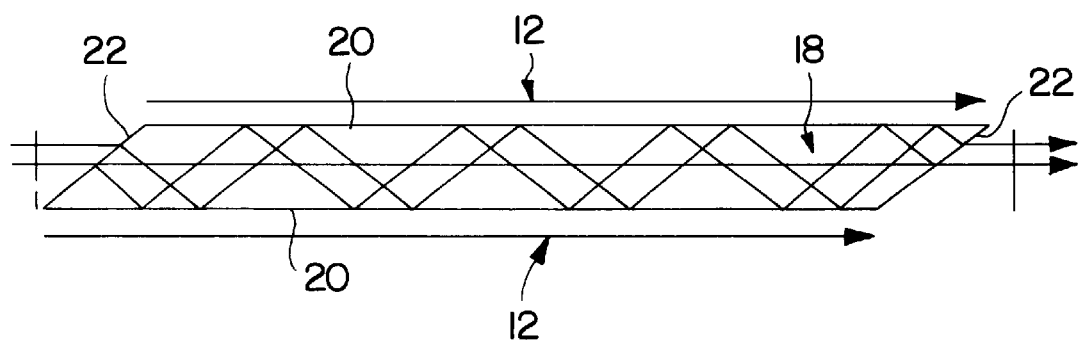
FIG. 2 is a schematic side view of a conventional total-internal-reflection slab laser.
Figure 3A:
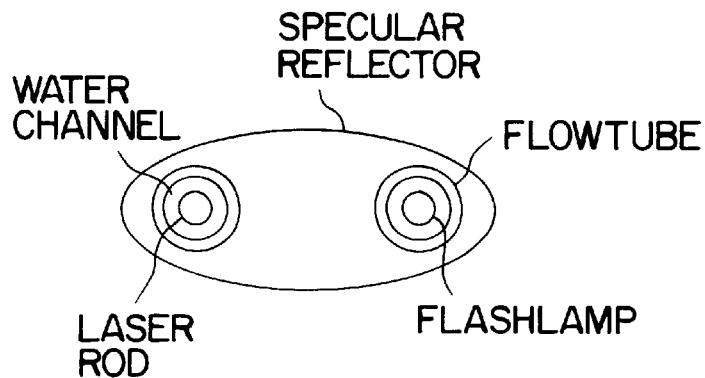
FIG. 3a is a schematic end view of a conventional classic elliptical pump chamber.
Figure 3B:
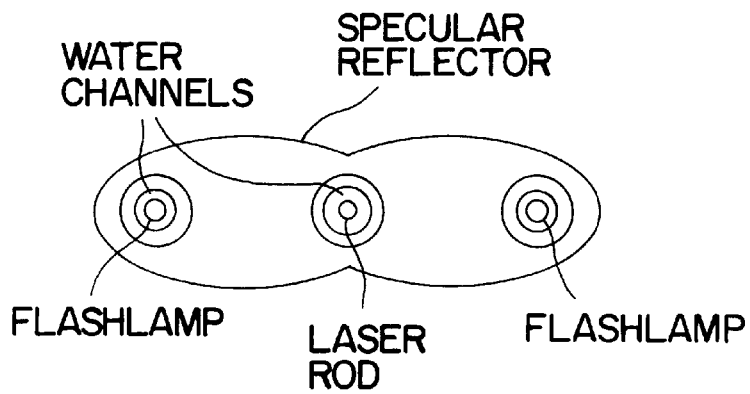
FIG. 3b is a schematic end view of a conventional dual elliptical pump chamber.
Figure 3C:
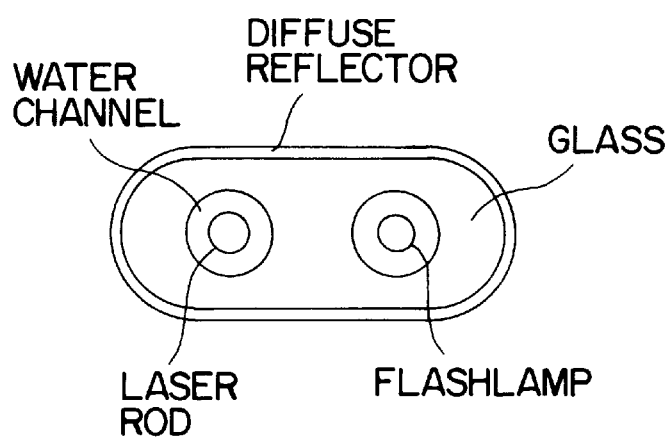
FIG. 3c is a schematic end view of a conventional close-coupled diffuse reflector pump chamber.
Figure 4:
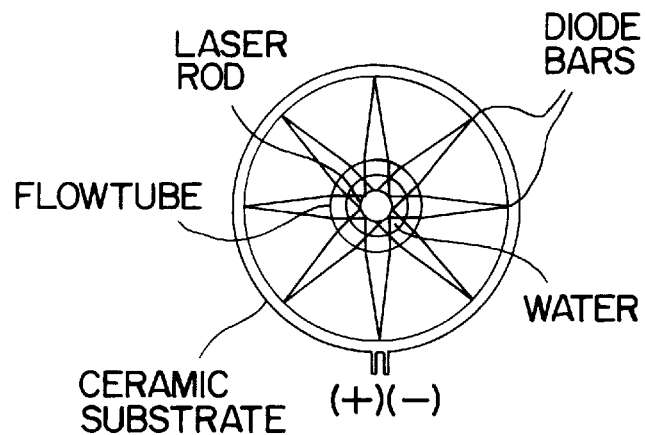
FIG. 4 is a schematic end view of a conventional transversely-diode-pumped laser.

The TIR rod laser shown in FIG. 5 can be optically-pumped exactly like any other flashlamp or diode-pumped rod laser, as shown previously in FIGS. 3 and 4.

Figure 6:
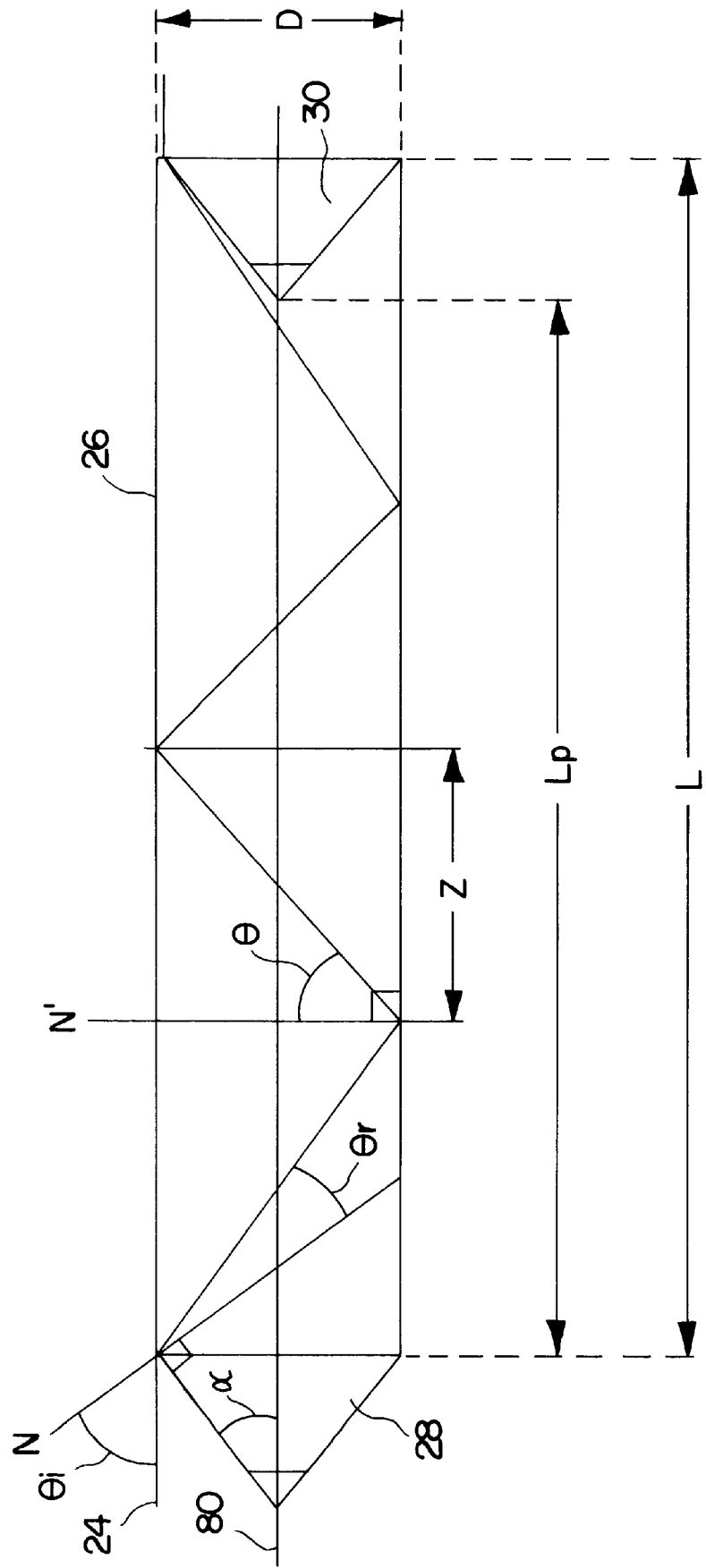
FIG. 6 is an enlarged schematic side view of the rod of FIG. 5 illustrating the geometry of the beam path within the rod.
Figure 7A:
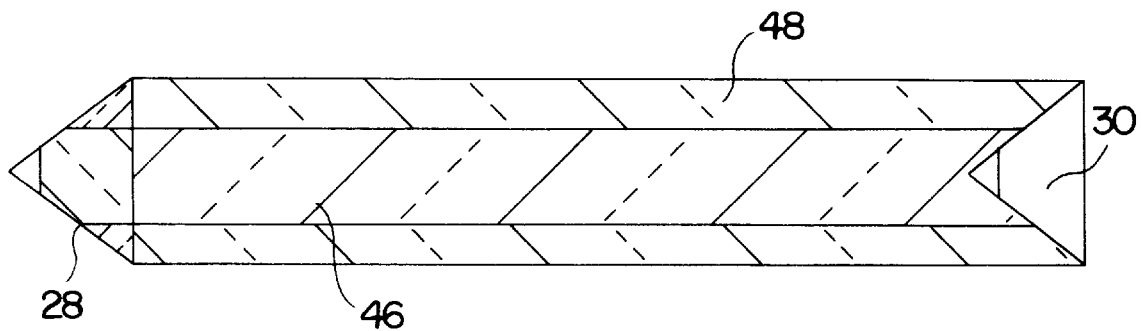
FIGS. 7a, 7b, and 7c are sectional views of alternate embodiments of the rod of FIG. 5
Figure 7B:
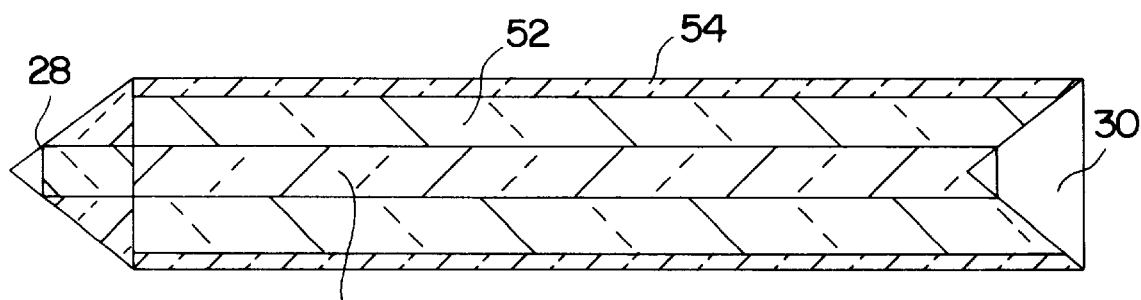
Figure 7C:
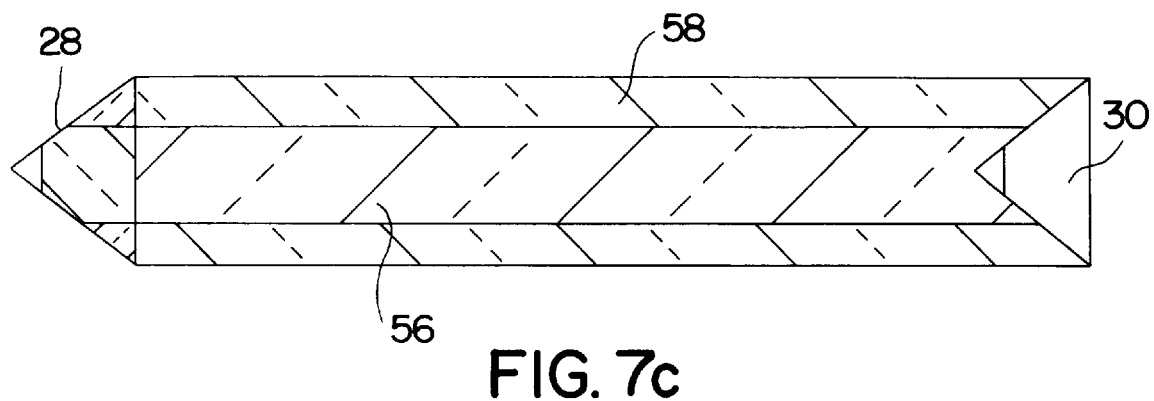
Figure 7D:
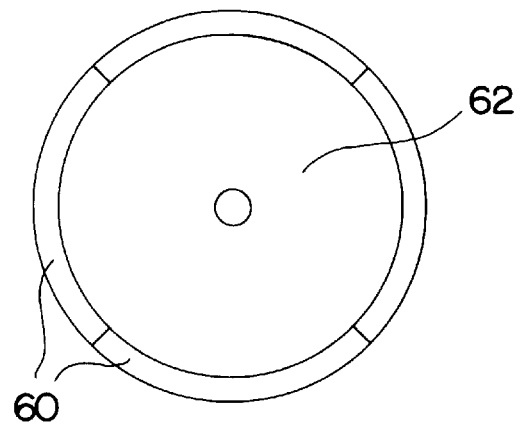
FIG. 7d is a schematic end view of an alternate embodiment of the rod of FIG. 5.

FIG. 6 illustrates the geometry of the laser. The conical ends 28, 30 have an apex half-angle $\alpha$; the rod diameter is D. The angle of incidence $\theta_i$ is related to the apex angle $\alpha$ by the relationship $$\theta_i + \alpha = 90°$$

N is the normal to the face, while N' is the normal to the TIR or barrel faces. Rays are incident on the barrel faces at an angle $\theta \geq \theta_c$ where $\theta_c$ is the critical angle, given by $$\theta_c = \sin^{-1}\left(\frac{n_2}{n_1}\right),$$

where $n_2$ is the index outside the laser medium, and usually equal to the index of air (1.00) or water (1.33) and $n_1 = n$, the index of the laser medium.

The refractive angle $\theta_r$ can be found from Snell's law as $$\theta_r = \sin^{-1}(\sin(\theta_i)/n)$$

where n is the linear refractive index at the laser wavelength. $\theta$ can be shown to be given by $$\theta = 90° + \theta_r - \theta_i = 90° + \sin^{-1}(\sin(\theta_i)/n) - \theta_i$$

thus by knowing the refractive index and the angle of incidence, $\theta$ can be calculated exactly. A special case is if the angle of incidence $\theta_i = \theta_B$, where $\theta_B$ is Brewster's angle, given by $$\theta_B = \tan^{-1}(n)$$

One pass through the thermal gradient (edge to center to edge) has a length associated with it of z given by $$z = D \tan(\theta)$$

and the rod length associated with N TIR reflections is then $$L = ND \tan(\theta)$$

The total path length $L_t$ inside the rod is given by $$L_t = ND/\cos(\theta)$$

Also shown in FIG. 6 is the pump length of the rod laser, given by $$L_p = ND \tan(\theta) - (D/2 \tan(\alpha))$$

These equations allow a complete description of the rod geometry needed for compensation.

FIG. 7 illustrates alternate embodiments of the rod of the present invention. In the embodiment shown in FIG. 7a, the rod comprises a core 46 doped (for example with Yb or Nd) YAG surrounded by a sleeve 48 of clear YAG (no doping). In FIG. 7b, the rod comprises a core 50 of doped YAG surrounded by a sleeve 52 of clear YAG which is in turn surrounded by a sleeve 54 of YAG doped with $Cr^{4+}$. In FIG. 7c, the rod comprises a core 56 of doped YAG surrounded by a sleeve 58 of YAG doped with $Cr^{4+}$. Such composite rods may be fabricated using diffusion-bonding techniques or with glue for example. The clear or doped annuli may be split, quartered or subdivided in other ways for ease of fabrication. Another implementation is shown in FIG. 7d where strips 60 of $Cr^{4+}$:YAG are diffusion-bonded or glued along the rod barrel 62. $Cr^{4+}$, is an effective absorber of amplified spontaneous emission (ASE) for Nd:YAG and Yb:YAG, and is also effective in reducing or eliminating parasitic oscillations that thrive in rod lasers that have polished barrels and high gain. ASE and parasites are generally not a problem for continuous-wave (CW) lasers.

Figure 8A:
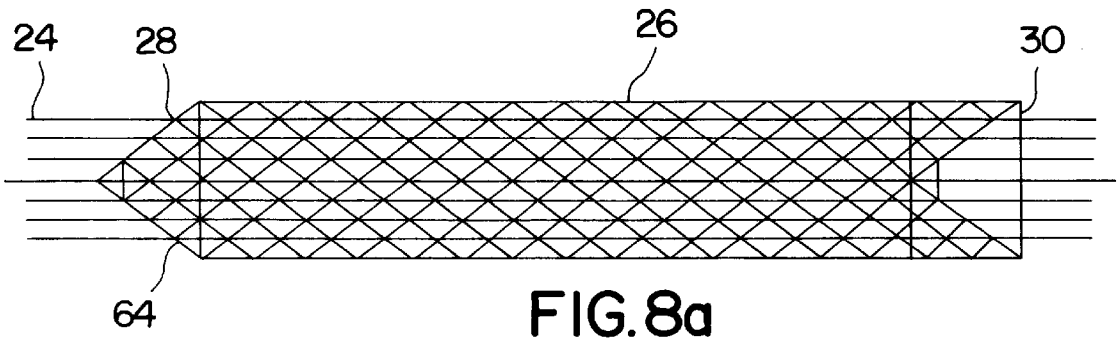
FIGS. 8a, 8b, and 8c are schematic side views of the rod of FIG. 5 illustrating the unextracted regions produced by an obscured input aperture.
Figure 8B:
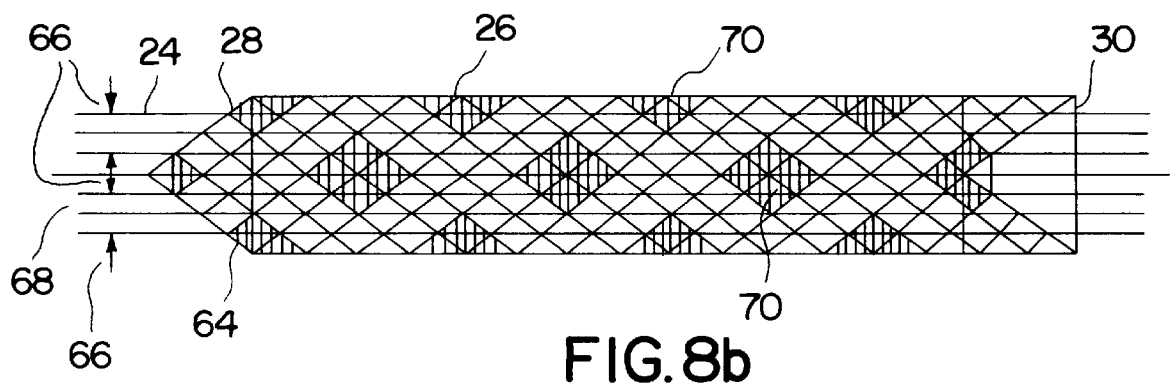
Figure 8C:
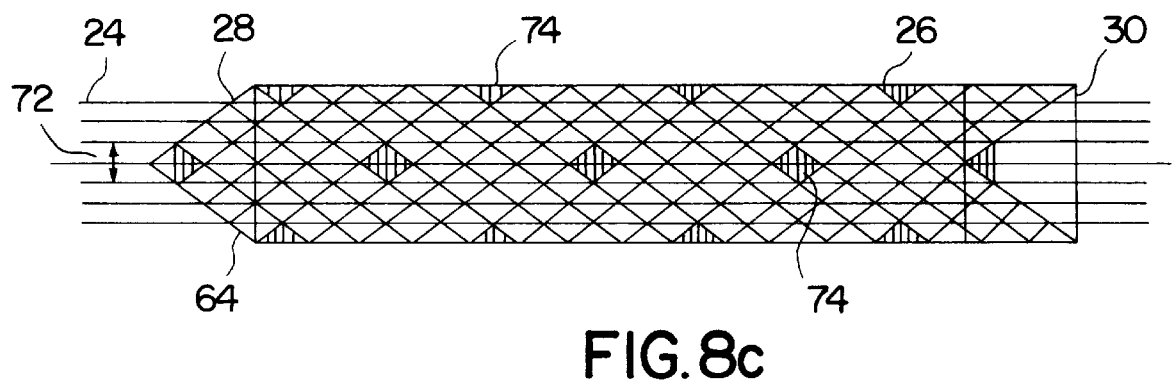

FIG. 8 illustrates the existence of unextracted regions within the rod. As illustrated in FIGS. 8a, 8b, and 8c, the magnitude of the unextracted regions depends on the degree to which the incident beam energy is transmitted through the input aperture. In FIG. 8a, the entire aperture 64 is utilized and no unextracted regions exist. In FIG. 8b, input aperture is obscured in three areas 66, allowing the incident beam energy to be transmitted through only a relatively small unobscured ring 68 of the input aperture 64, resulting in large unextracted regions 70. In FIG. 8c, only the center portion 72 of the input aperture 64 is obscured resulting in relatively small unextracted regions 74. The limit to the volume extraction is given by the need to have the truncated apex on the end conical regions. This can be reduced to the minimum by careful fabrication and the use of shallow apex angles $\alpha$.

Figure 9A:
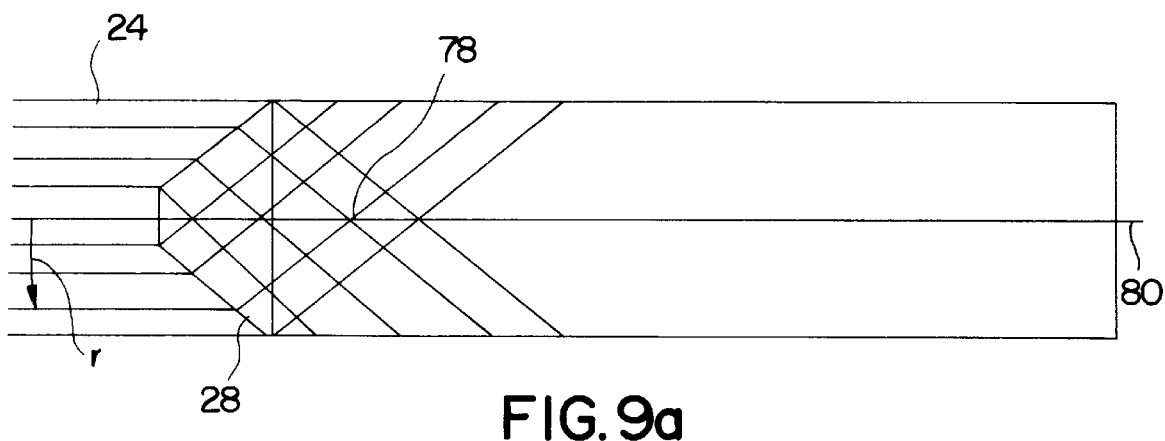
FIG. 9a is a schematic side view of the rod of FIG. 5.
Figure 9B:
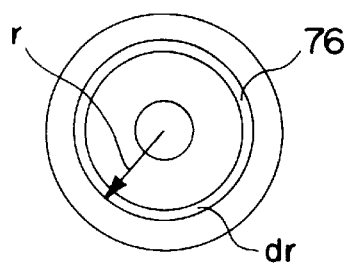
FIG. 9b is a schematic end view of the rod of FIG. 5 illustrating the focusing of rays on the rod optical axis.

FIGS. 9a and 9b illustrate an unusual feature of this laser. If we consider a thin annulus 76 on the rod face, with radius r, we see that all rays that are incident in the region between r and r+dr are focused to the same point 78 on the rod optical axis 80. This is cause for concern, particularly in pulsed lasers where the peak power and intensities can become quite large. If the bulk damage threshold is exceeded the rod material will break down in an avalanche multiplication process, leading to irreversible damage along the axis 80 of the rod. It is fortunate, however, that not all annuli on the face are focused to the same point on the optical axis 80. Instead, it can be seen that successive annuli on the face are focused to different spots on the axis 80, essentially resulting in a "smeared" focus in the z direction. As shown in FIG. 9, making the face angle $\alpha$ (FIG. 6) large smears the focal region out even further.

Diffraction and finite perturbations of the face finishing and bulk optical index perturbations will define the transverse size of the smeared distribution. Detailed diffraction calculations will need to be performed if breakdown is observed in real devices. Preliminary calculations, however, show that for CW lasers breakdown should not be a problem. The damage threshold for the bulk of an optical material is typically 10 times that of a surface; this fact works to our advantage in this geometry since all focusing takes place in the material bulk.

Figure 10:
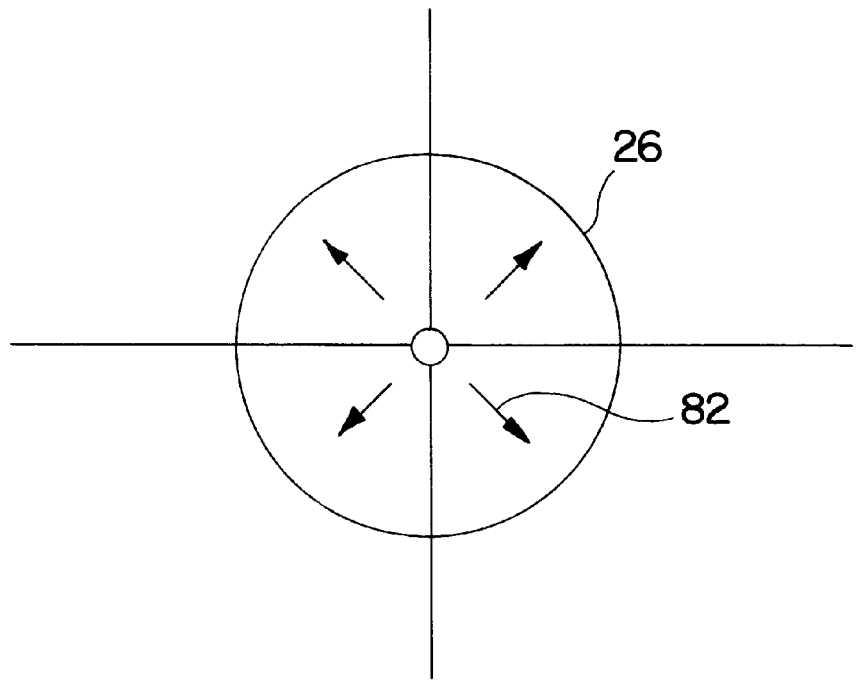
FIG. 10 is a schematic end view of a total-internal-reflection thermally compensated rod laser in accordance with the invention having conical faces cut at Brewster's angle illustrating the polarization components within the rod.

A very unusual feature of this laser is the existence of polarization effects. If the conical faces 28, 30 of the rod 26 are cut at Brewster's angle, only modes whose polarization is as shown in FIG. 10 (radial) can be supported. An advantage of this configuration is that a beam traversing the rod will suffer no thermally induced birefringence. This is primarily because the loss for radial polarization vectors 82 is minimal while other polarizations will suffer a great enough loss that they will not reach threshold in the oscillator. A $TEM_{01}$ mode, for example, would oscillate using this configuration.

Figure 11:
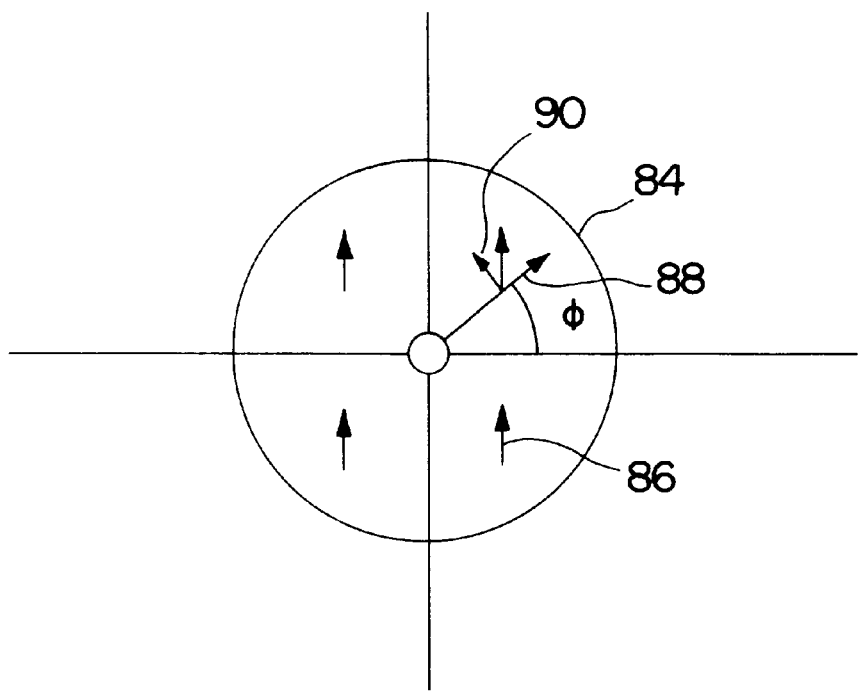
FIG. 11 is a schematic end view of a conventional rod illustrating the polarization components within the rod.

In general, however, most lasers 84 operate with linear polarization 86 as shown In FIG. 11. The component 88 of the polarization along a radius is referred to as the radial polarization while the perpendicular component 90 to the radial is referred to as the theta component. If for any reason the two components 88, 90 become separated in phase δ, then the resulting polarization is referred to as elliptical. Thermal effects in straight-through rod amplifiers result in elliptical polarization, and the amount is dependent upon the position on the rod face.

If linear polarization is incident upon a Brewster face, conventional modes such as a $TEM_{00}$ mode cannot be sustained because losses occur at the dielectric-air interface which are dependent upon the angle φ shown in FIG. 11. For φ=0 and 360° for example, reflective losses at the input face will be total (reflectivity R=1), while for φ=90 and 180°, reflective losses will be zero (φ=0). For large apex angles α, however, typically greater than about 45°, this situation can be remedied by coating the input and exit faces with an anti-reflective dielectric coating designed to provide the same loss for radial and tangential polarization regardless of the value of φ.

Figure 12:
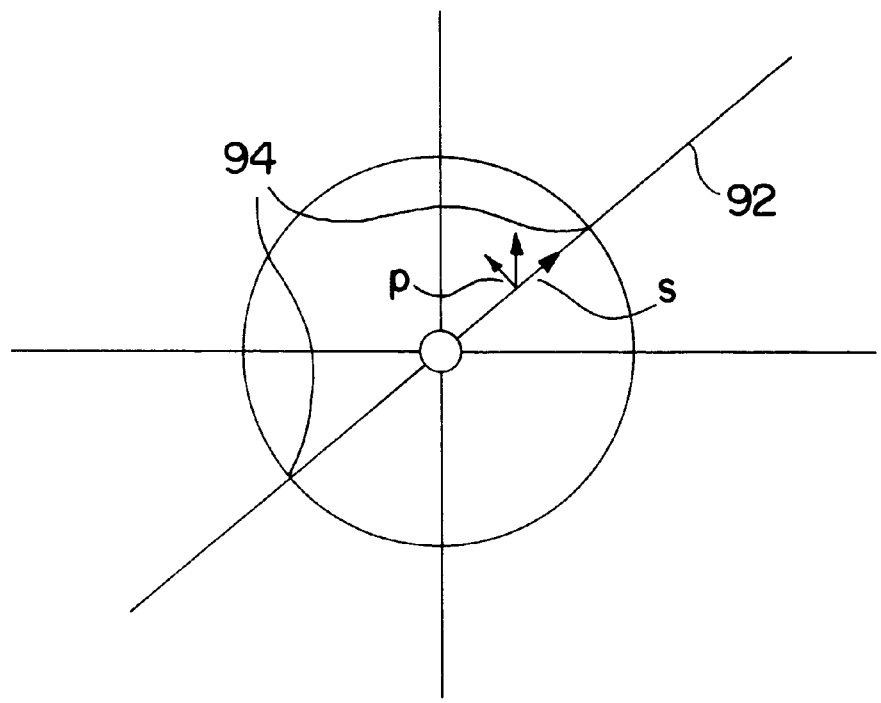
FIG. 12 is a schematic end view of the rod of FIG. 10 illustrating the polarization of a ray within the rod.

With the TIR rod amplifier described here, however, an effect occurs that does not occur in conventional straight-through rod or slab amplifiers. In general depolarization occurs when a ray is incident upon a dielectric surface at an angle greater than the TIR angle. FIG. 12 shows a ray incident on the TIR rod face that is reflected and is reflected from the barrel faces. The plane 92 through the TIR reflections 94 and the incident point is referred to as the plane of incidence; and a ray initially polarized can be broken up into two components, perpendicular to the plane of incidence, and parallel to it. The parallel component is identical to the r component of FIG. 11, and is also referred to as the s component. The perpendicular component is the same as the theta component in FIG. 11 and is referred to as the p component.

For radial polarization only, there is no theta component and in reflection the radial or s component remains s, that is there is no depolarization. This situation is the analog of that in the slab laser where only an incident s component remains an s component. For incident light that is linearly polarized, as may happen for small apex angles α for example, both s and p components exist upon TIR reflection, and a phase delay δ results. This phase delay depends only upon the angle of incidence and the index of refraction of the rod material and the media adjacent to the rod barrel. Since there is a phase delay δ associated with each TIR reflection, after N bounces a total phase delay of Nδ results. In the TIR rod in which the path length of each ray is identical as is the number of TIR reflections each suffers, the total phase delay of each ray is identical, irrespective of the entering position on the rod conical face. The phase delay δ can be calculated from:

$$\delta(\theta_i) = 2\tan^{-1}\left[\frac{\cos(\theta_i)(\sin^2(\theta_i) - n_{12}^2)^{1/2}}{\sin^2(\theta_i)}\right]$$

Figure 13:
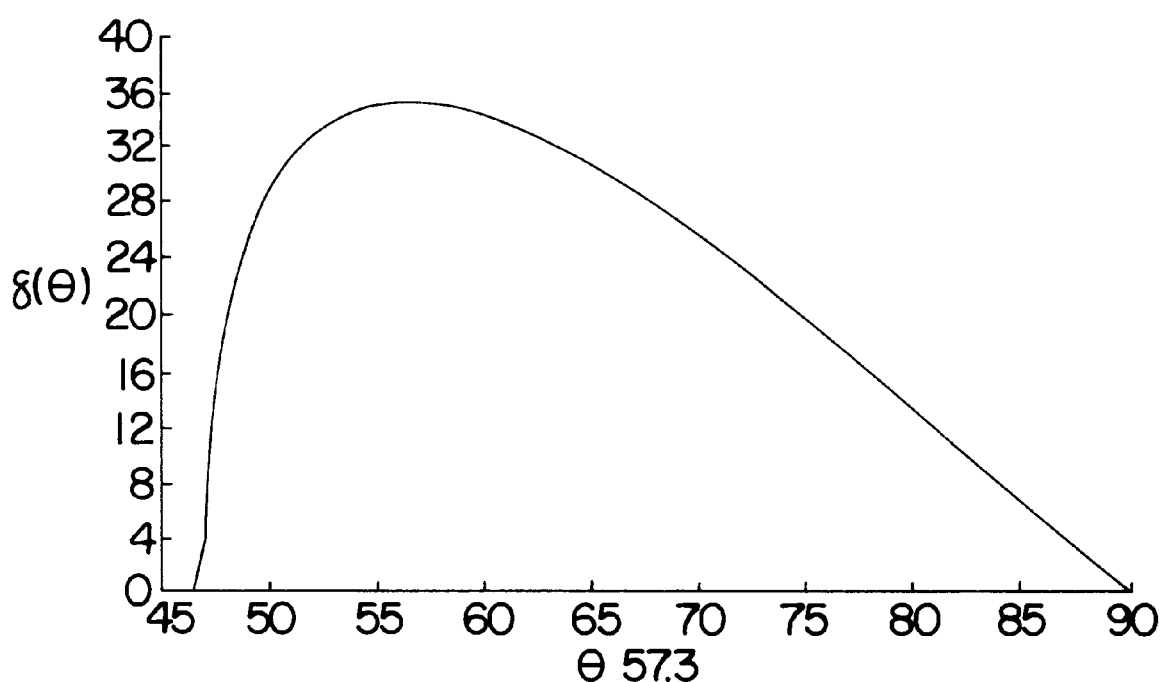
FIG. 13 is a graph plotting the phase delay versus the angle of incidence for the rod of FIG. 10.

Here $n_{12}=n_1/n_2$, where $n_1$ is the index of the media outside of the rod barrel and $n_2$ is the index of the laser rod. See Max Born and Emil Wolf, "Principles of Optics," Sixth Edition, Pergamon Press (1980). This expression vanishes for an angle of incidence of 90°, and at the critical angle $\theta_c$, as shown in FIG. 13 where the phase delay (in degrees) is plotted against the angle of incidence at the TIR rod barrel. The calculation was for Nd or Yb:YAG with index $n_1$=1.82 and immersed in water with index $n_2$=1.33. The maximum phase delay of 35.37° occurs for an angle of incidence of about 57°.

For the s and p components to be back "in step" and return to linear polarization, we must have a total phase delay in the rod of 360 degrees. Since the maximum phase delay per reflection is only 35.37 degrees, we must have multiple reflections to achieve the condition $$N\delta = 2\pi\text{rad} = 360°$$

The previous relationships and FIG. 13 may be used to calculate how many bounces are needed to just satisfy this criteria for various rod diameters and apex angles α. For an apex angle of 41.65°, which corresponds to an angle of incidence on the end faces of 48.35°, and an angle of incidence on the barrel of 65.89°, we find that for N=12 (12 TIR bounces) and a typical Nd:YAG rod diameter of 5 mm, the rod length must be 13.41 cm. Similarly, for a 2 mm diameter rod typical of that used for Yb:YAG lasers, for N=12 the rod length is 5.36 cm.

Certain geometries, or numbers or bounces, give complete compensation for the phase delay between the s and p polarization components, resulting in no net depolarization after passing through the TIR rod. This situation is unique to TIR rod lasers and does not happen in TIR slab lasers. For some laser systems, radial polarization may be acceptable and under that circumstance there are no restrictions on the geometry of the TIR rod excepting those needed for internal compensation of thermal effects. For linear polarization, the s and p depolarization vanishes for certain rod geometries. Of particular interest are those that use relatively large apex angles or small angles of incidence where dielectric coatings applied to the end faces can be used to achieve near equal losses for any position and polarization on the faces. This is most easily achieved when the apex angle is large. Another goal of a large apex angle is to minimize depolarization losses due to the end faces alone.

Figure 14:
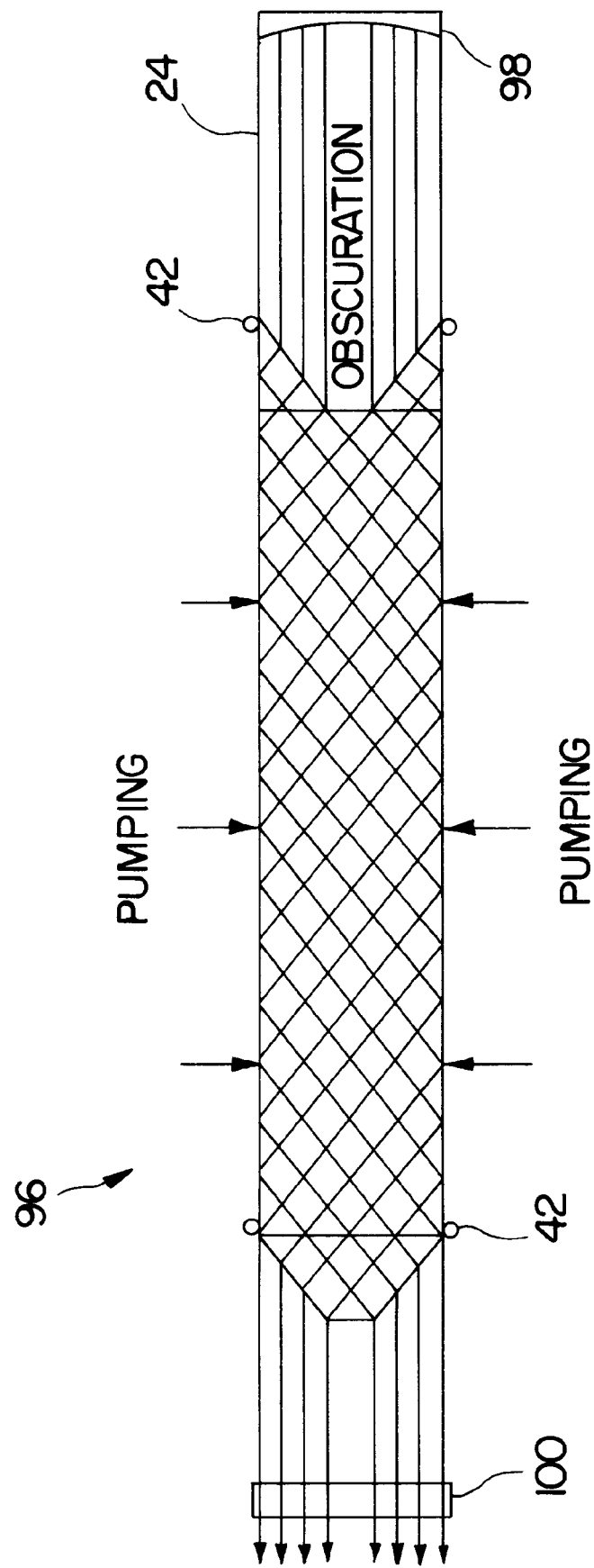
FIG. 14 is a schematic side view of a resonator including the rod of FIG. 5.

FIG. 14 shows one implementation of the TIR rod amplifier. The resonator 96 is conventional and known as a confocal or semi-symmetric resonator. One end consists of a curved high reflector 98 while the opposite outcoupler 100 is a flat mirror or partial reflector, which is allowed to leak out some of the laser light. The resonator 96 is stable in the sense understood by laser designers. The g1 parameter is $$g1 = 1 - L/R_1$$

and g2 is $$g2 = 1 - L/R_2$$

where $R_1$ and $R_2$ are the radii of curvature of the two mirrors, and L the separation of them, then the resonator is stable if $$0 < g1g2 < 1$$

a condition satisfied by the resonator in FIG. 13. Note, however, that because there is no thermal focusing, that g1g2 remains constant independent of average power and therefore the beam and mode quality of the laser are also independent of average power. Conventional rod lasers are very power dependent, with mode content and beam quality changing with average power, and the resonator must be analyzed by including a power dependent lens in the resonator.

While preferred embodiments of the invention have been set forth for purposes of illustration, the foregoing description should not be deemed a limitation of the invention herein. Accordingly, various modifications, adaptations and alternatives may occur to one skilled in the art without departing from the spirit and the scope of the present invention.

What is claimed is:

1. A lasing rod composed of crystalline or glass material doped with at least one lasing ion defining an optical axis and having an axially extending, substantially optically flat, exterior surface and first and second substantially optically flat conical end surfaces, wherein the first conical end surface defines a convex surface and the second conical end surface defines a concave surface.

2. The lasing rod of claim 1 wherein the first and second conical end surfaces are coaxial with the optical axis.

3. The lasing rod of claim 1 wherein the first and second conical end surfaces are congruent.

4. The lasing rod of claim 1 wherein the first and second conical end surface each comprise an apex having a truncated tip.

5. The lasing rod of claim 1 further comprising an annulus of fluid disposed adjacent the exterior surface for actively cooling the rod.

6. The lasing rod of claim 5 wherein the fluid is selected from the group consisting of water, water and ethylene glycol, gas, and cryogenic fluid.

7. The lasing rod of claim 1 further comprising an axially extending center column and a first annular portion, the center column being doped with an active lasing ion and the first annular portion being composed of a clear laser material or an amplified spontaneous emission absorbing material.

8. The lasing rod of claim 7 wherein the center column is composed of Nd:YAG or Yb:YAG.

9. The lasing rod of claim 7 wherein the first annular portion is composed of YAG.

10. The lasing rod of claim 9 further comprising a second annular portion, the first annular portion being disposed intermediate the second annular portion and the center column, the second annular portion comprising an amplified spontaneous emission absorbing material.

11. The lasing rod of claim 7 wherein the first annular portion is composed of YAG doped with $Cr^{4+}$.

12. The lasing rod of claim 7 wherein the first annular portion comprises a plurality of strips bonded to the center column.

13. The lasing rod of claim 1 wherein the rod focuses light along the optical axis, the first conical end surface comprises an apex having an angle $\alpha$, $\alpha$ having a value selected to smear the focus along the optical axis.

14. The lasing rod of claim 1 wherein the first and second conical end surfaces each comprise an apex having an angle $\alpha$, $\alpha$ having a value substantially equal to the complement of Brewster's angle.

15. The lasing rod of claim 1 wherein the rod has a geometry comprising a diameter and a length selected to provide substantially no net depolarization of an incident beam from TIR reflections.

16. A laser resonator comprising:

a lasing rod composed of crystalline or glass material doped with at least one lasing ion defining an optical axis and having an axially extending exterior surface and first and second conical end surfaces, an outcoupler disposed adjacent the second conical end surface; and wherein one of the first or second end surfaces is convex and the other of the first or second end surfaces is concave a high reflector disposed adjacent the first conical end surface.

17. The laser resonator of claim 16 wherein the outcoupler comprises a partial reflector.

18. The laser resonator of claim 16 wherein the high reflector has a face disposed adjacent the first conical end surface, the face of the high reflector having a concave surface.

19. The laser resonator of claim 16 wherein the first and second conical end surfaces are congruent.

* * * * *